US006884112B1

(12) United States Patent
Juntwait et al.

(10) Patent No.: US 6,884,112 B1
(45) Date of Patent: Apr. 26, 2005

(54) ELECTRICAL CONNECTOR HAVING IMPROVED SECURING MEMBER

(75) Inventors: Eric D. Juntwait, Hummelstown, PA (US); Chong H. Yi, Mechanicsburg, PA (US)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/769,266

(22) Filed: Jan. 30, 2004

(51) Int. Cl.[7] .......................... H01R 13/73; H02B 1/01
(52) U.S. Cl. ........................ 439/573; 439/567; 439/570
(58) Field of Search ................................ 439/567, 573, 439/570

(56) References Cited

U.S. PATENT DOCUMENTS 5,178,557 A * 1/1993 Hashiguchi ................. 439/357
5,228,873 A * 7/1993 Hirai .......................... 439/607
5,679,009 A * 10/1997 Okumura et al. ............. 439/79
6,579,123 B2 * 6/2003 Kasahara .................... 439/573

* cited by examiner

*Primary Examiner*—Hae Moon Hyeon
(74) *Attorney, Agent, or Firm*—Wei Te Chung

(57) ABSTRACT

An electrical connector (1) includes an insulative housing (10), a number of contacts (20) received in the insulative housing, and a pair of securing members (50). The insulative housing includes a pair of support portions (13) at opposite ends thereof. Each of the support portions defines a cavity (132) and a through hole (133) communicating with the cavity. The securing members are mounted on the opposite ends of the insulative housing. Each of the securing members includes a mounting boss (53) received in a corresponding cavity of the insulative housing and defining a threaded hole (530) aligning with the through hole of the insulative housing adapted for engaging with a bolt (70) to mount the electrical connector on a printed circuit board (60).

13 Claims, 5 Drawing Sheets

ELECTRICAL CONNECTOR HAVING IMPROVED SECURING MEMBER

BACKGROUND OF THE INVENTION

1. Field of the Invention

The present invention relates to an electrical connector, and particularly to an electrical connector having a pair of securing members for mounting the electrical connector to a printed circuit board.

2. Description of Related Art

In personal computers or other electronic devices, electrical connectors are often mounted to printed circuit boards for electrically connecting the printed circuit boards with other electronic components. A number of methods for fixing the electrical connectors to the printed circuits are known in the art. For example, U.S. Pat. No. 6,638,111 discloses a board mounted electrical connector including a housing, a plurality of terminals received in the housing, a metal shield surrounding the housing, and a mounting component mounted on the housing. The mounting component includes a pair of aperture mounting bosses for receiving appropriate fasteners for mounting the electrical connector on a printed circuit board.

However, the mounting component is a large die-cast part and has a pair of latch arms and the pair of mounting bosses at opposite ends thereof. This creates a sloppy fit between the housing and the mounting component and causes a thermal mis-match problem during the reflow process. In addition, when the electrical connector is mounted on the printed circuit board by the fasteners engaged with the apertures of the mounting bosses, the fastening force is finally exerted on solder portions of the terminals. This causes a stress being added on the solder joints between the solder portions of the terminals and solder pads of the printed circuit board.

Hence, an improved electrical connector is required to overcome the disadvantages of the conventional electrical connector.

SUMMARY OF THE INVENTION

An object of the present invention is to provide an electrical connector having improved securing members which can strain relief solder portions of contacts thereof.

To achieve the above object, an electrical connector in accordance with the present invention comprises an insulative housing, a plurality of contacts received in the insulative housing, and a pair of securing members. The insulative housing includes a pair of support portions at opposite ends thereof. Each of the support portions defines a cavity and a through hole communicating with the cavity. The securing members are mounted on the opposite ends of the insulative housing. Each of the securing members includes a mounting boss received in a corresponding cavity of the insulative housing and defining a threaded hole aligning with the through hole of the insulative housing adapted for engaging with a bolt to mount the electrical connector on a printed circuit board.

Other objects, advantages and novel features of the invention will become more apparent from the following detailed description when taken in conjunction with the accompanying drawings.

DETAILED DESCRIPTION OF THE INVENTION

Figure 1:
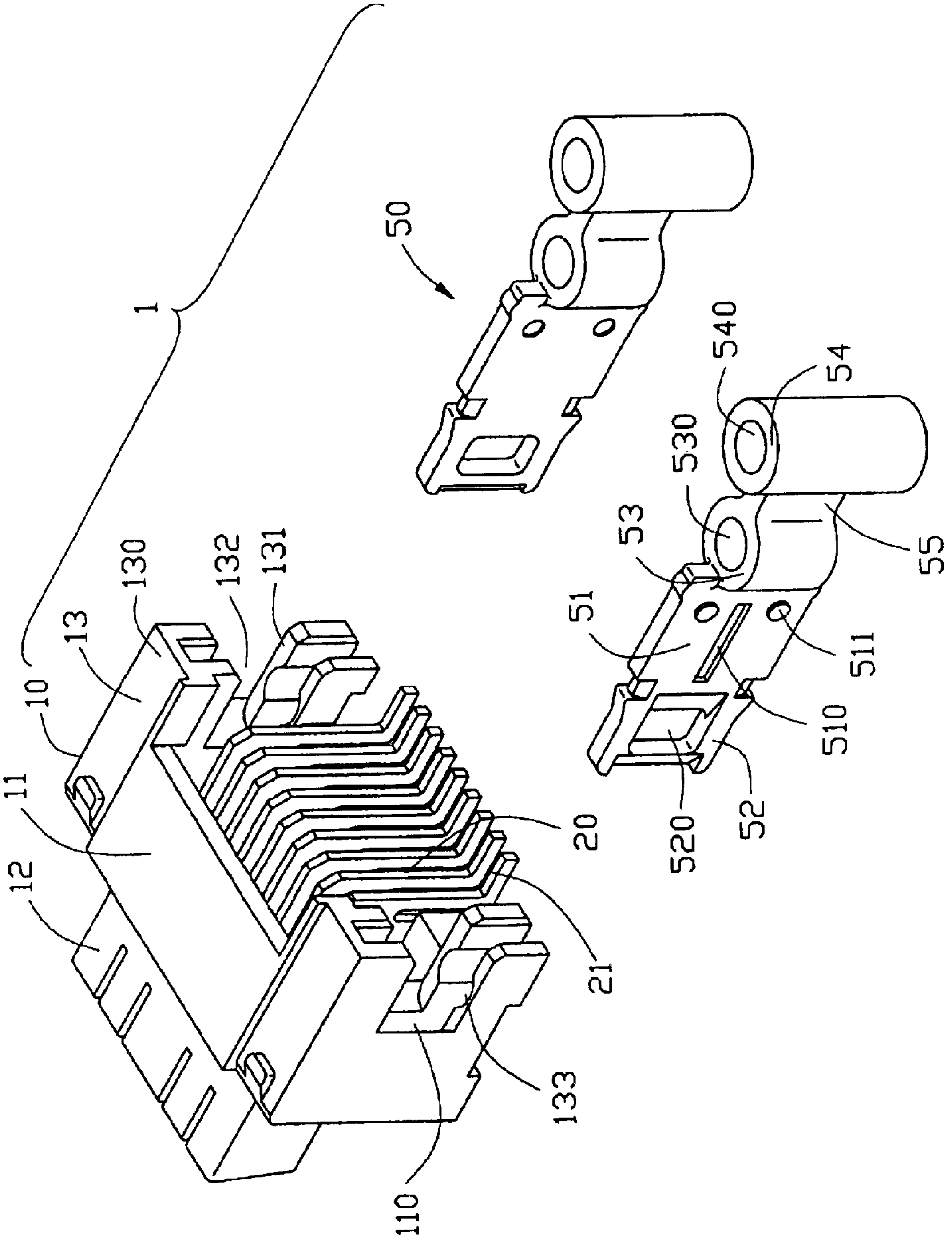
FIG. 1 is a top, rear partially exploded perspective view of an electrical connector in accordance with the present invention but with a shield member and an gasket thereof being taken away.
Figure 2:
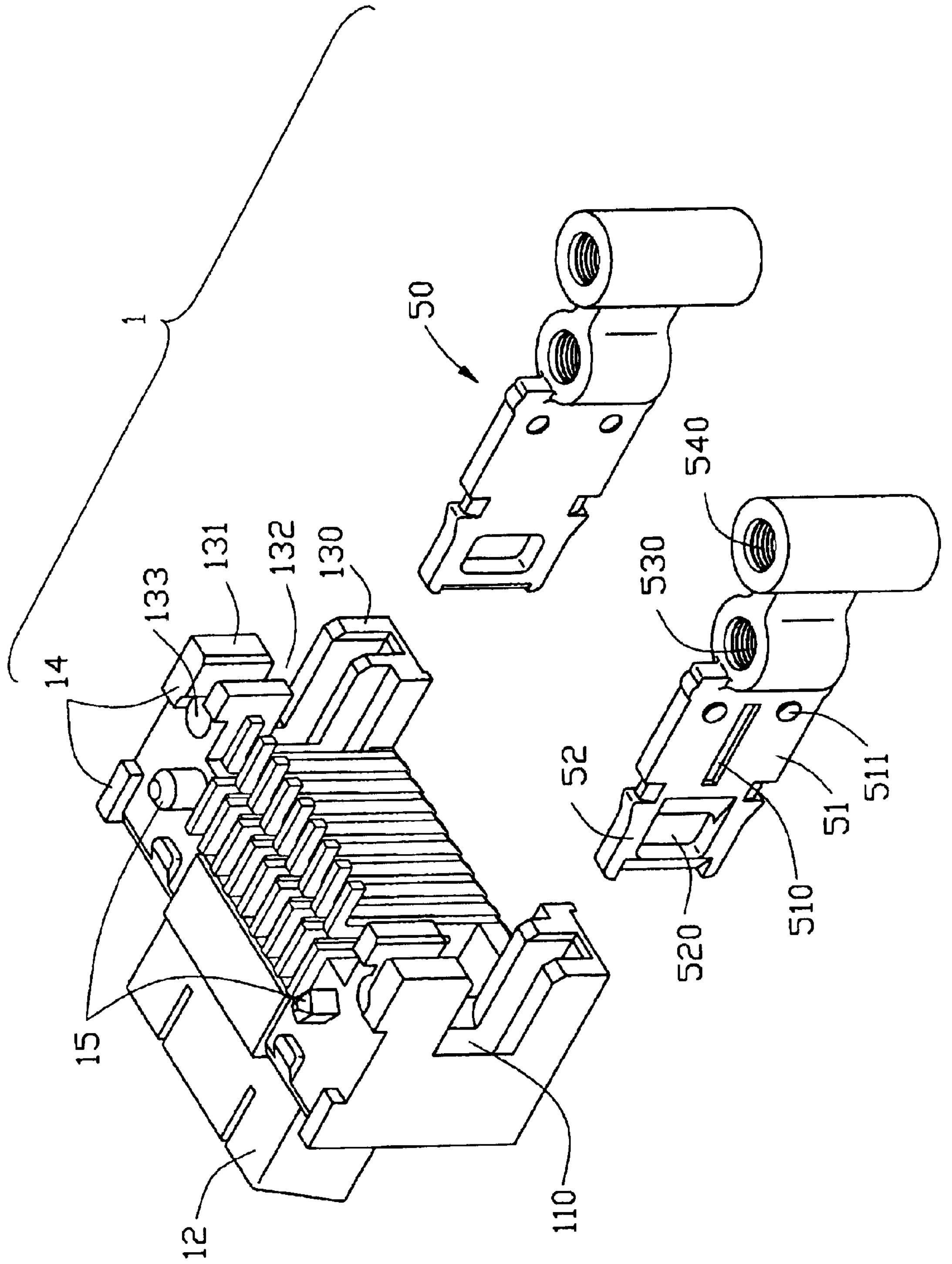
FIG. 2 is a view similar to FIG. 1 but taken from a bottom, rear aspect.
Figure 3:
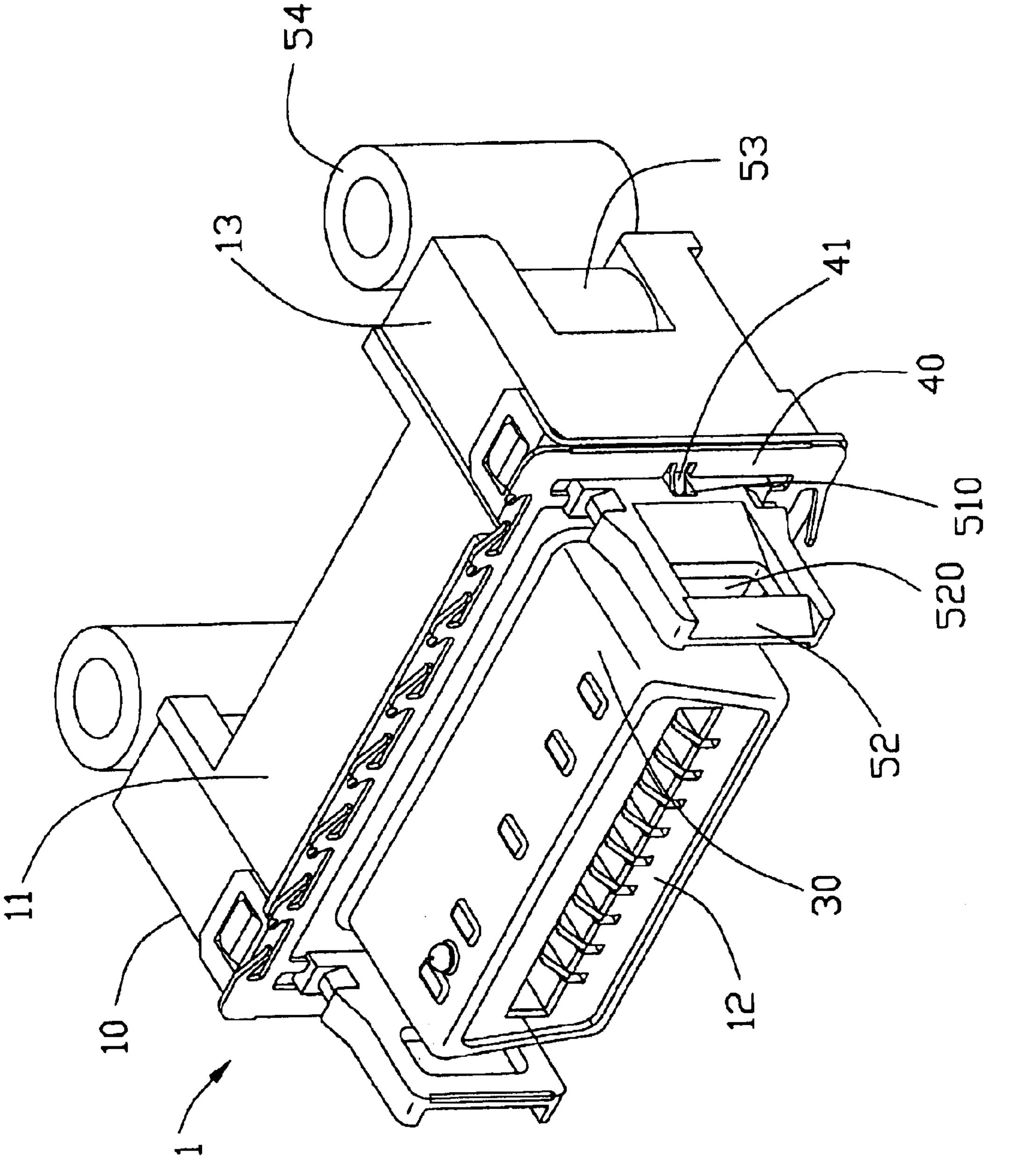
FIG. 3 is a front, top assembled perspective view of the electrical connector of FIG. 1.

Referring to FIGS. 1–4, an electrical connector 1 in accordance with the present invention comprises an insulative housing 10, a plurality of contacts 20, a shield member 30, a gasket 40, and a pair of securing members 50.

The insulative housing 10 includes a substantially rectangular base portion 11, a mating portion 12 extending forwardly from the base portion 11, a pair of support portions 13 extending rearwardly from opposite ends of the base portion 11, a plurality of standoffs 14 formed on a bottom face thereof, and a pair of positioning posts 15 extending downwardly from a bottom face of the base portion 11. Each of the support portions 13 comprises an upper beam 130 and a lower beam 131. The upper and the lower beams 130, 131 define a cavity 132 therebetween. A pair of retention slots 110 extend rearwardly from a front face of the base portion 11 at opposite side of the mating portion 12 and into the upper and the lower beams 130, 131 of the support portions 13 to communicate with the cavities 132. Each of the lower beams 131 defines a through hole 133 communicating with a corresponding cavity 132 and extending downwardly through a bottom face thereof.

The contacts 20 are received in the insulative housing 10. Each of the contacts 20 comprises a tail portion 21 for soldering to a corresponding conductive pad 61 of a printed circuit board 60 on which the electrical connector 1 is mounted.

The pair of securing members 50 are both die-cast metallic parts and are identical in configuration and structure. Each of the securing members 50 comprises a body portion 51 having a recess 510 and a pair of embossments 511 formed on an outer side thereof, a latch portion 52 extending forwardly from the body portion 51, a first mounting boss 53 at a rear end of the body portion 51, a second mounting boss 54 located behind and in alignment with the first mounting boss 53 along a mating direction of the electrical connector 1, and a transitional portion 55 connecting the first mounting boss 53 with the second mounting boss 54. The latch portion 52 defines an opening 520 for engaging with a corresponding part of a complementary connector (not shown). The first and the second mounting bosses 53, 54 respectively define a threaded hole 530, 540.

In assembly, the latch portions 52 of the securing members 50 pass through the retention slots 110 of the insulative housing 10 and forwardly extend beyond the front face of the base portion 11. The body portions 51 are received in the retention slots 110 of the insulative housing 10 with the embossments 511 engaging with inner sides of the retention slots 110 for retaining the securing members 50 therein. The first mounting bosses 53 are received in the cavities 132 of the insulative housing 10 with the threaded holes 530 vertically aligned with the through holes 133. The second mounting bosses 54 are located behind the support portions 13 of the insulative housing 10. The shield member 30 is assembled onto the insulative housing 10 and encloses the mating portion 12 of the insulative housing 10. The gasket 40 is attached on the shielding member 30 and has a pair of tabs 41 abutting against the recesses 510 of the securing members 50 to establish an electrical connection between the shield member 30 and the securing members 50.

Figure 4:
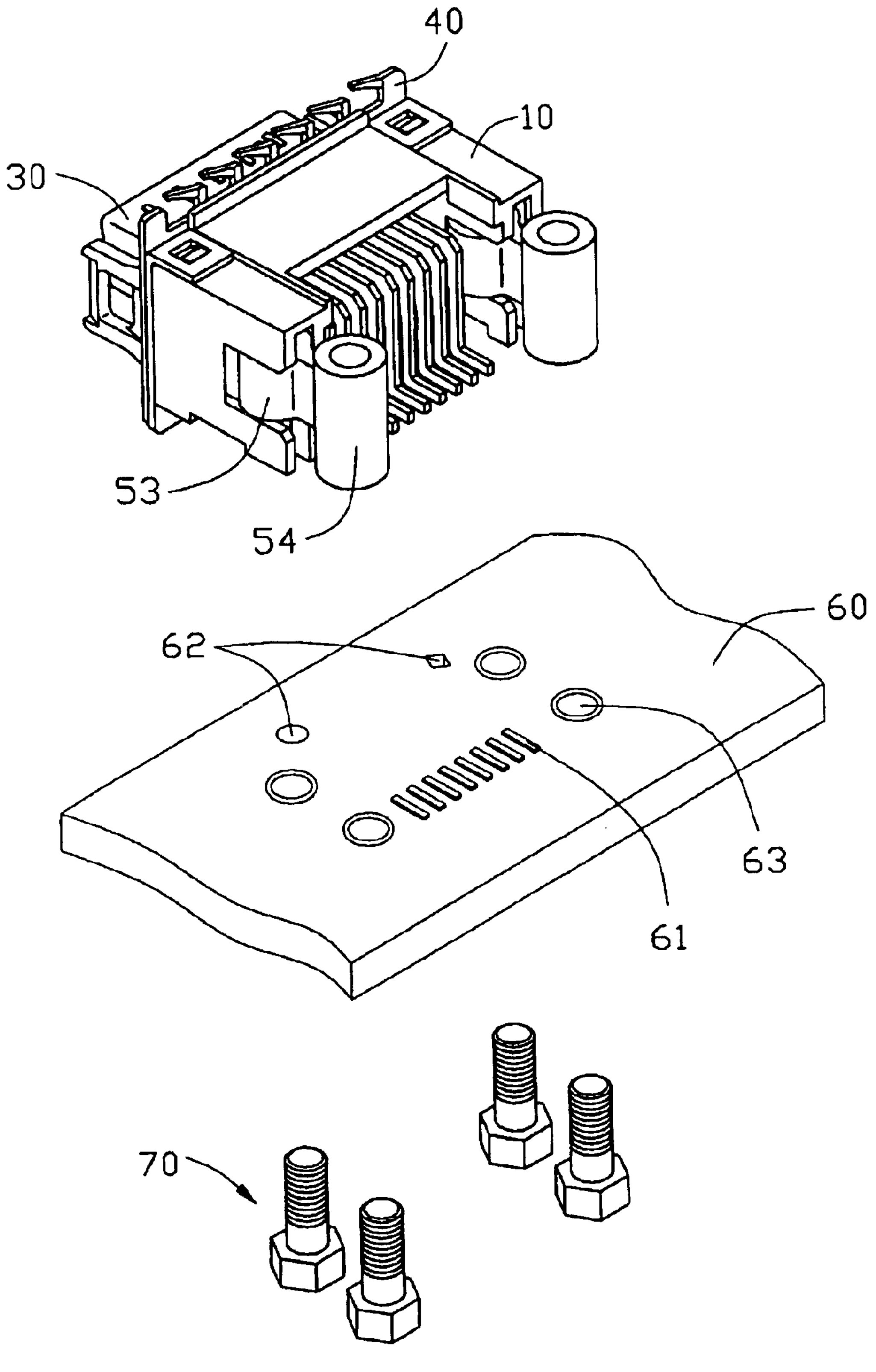
FIG. 4 is a rear, top assembled perspective view of the electrical connector, a printed circuit board on which the electrical connector is mounted and two pairs of screws for engaging with securing members of the electrical connector.
Figure 5:
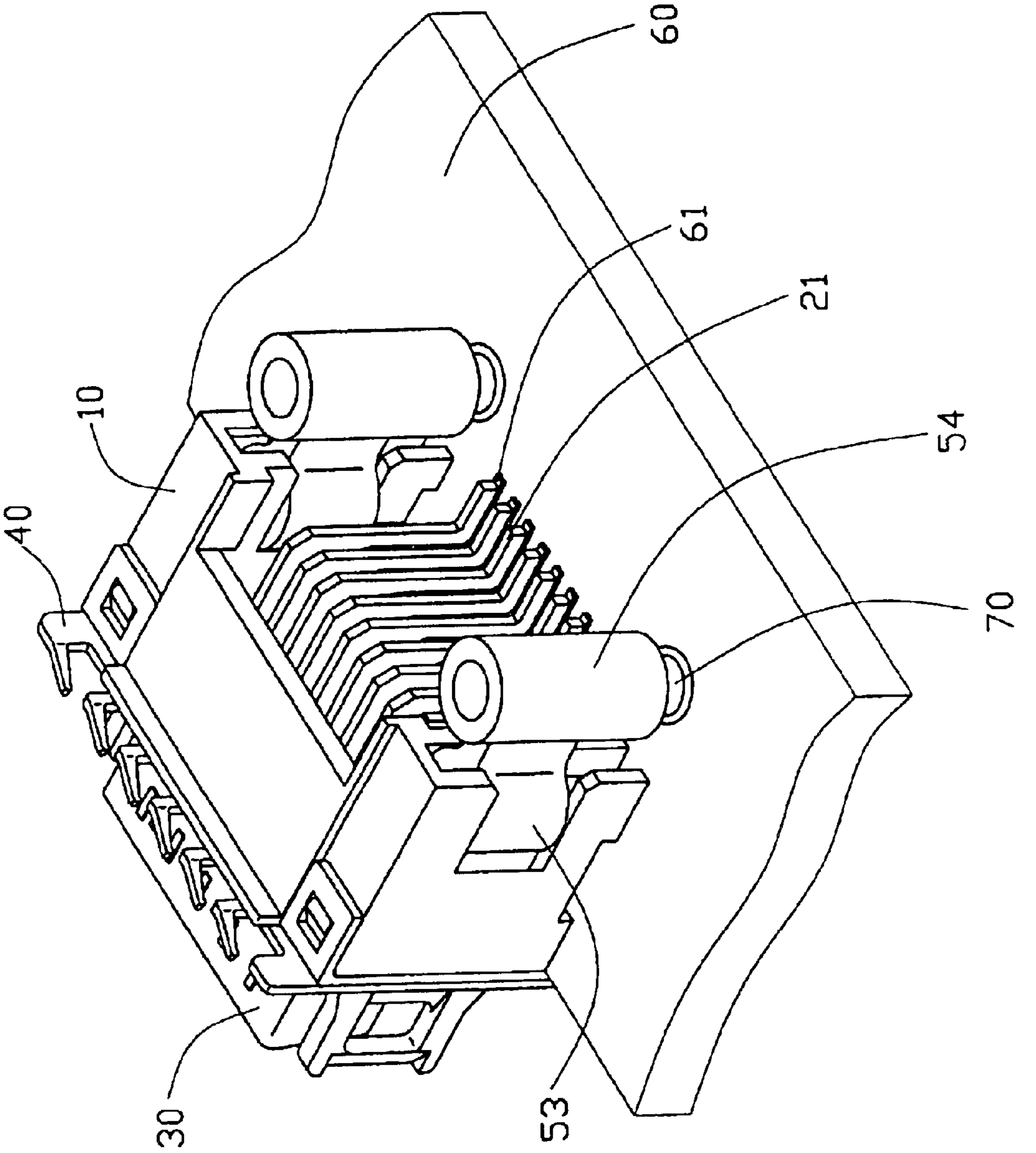
FIG. 5 is a view similar to FIG. 4 but showing the electrical connector mounted on the printed circuit board.

Referring to FIG. 5 in conjunction with FIG. 4, when the electrical connector 1 is mounted on the printed circuit board 60, the positioning posts 15 of the insulative housing 10 are inserted into positioning holes 62 of the printed circuit board 60. The tail portions 21 of the contacts 20 are soldered to the conductive pads 61 of the printed circuit board 60. The threaded holes 530, 540 of the first and the second mounting bosses 53, 54 are vertically aligned with corresponding plated through holes 63 of the printed circuit board 60. Two pairs of bolts 70 pass through the plated through holes 63 from a lower side of the printed circuit board 60 and engage with the threaded holes 530, 540 of the securing members 50 for retaining the electrical connector 1 on the printed circuit board 60, thereby establishing electrical connections between the securing members 50 and the plated through holes 63. In the present invention, the fastening force exerts on the lower beams 131 of the insulative housing 10 to stain relief the tail portions 21 of the contacts 20.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the fill extent indicated by the broad general meaning of the terms in which the appended claims are expressed.

What is claimed is:

1. An electrical connector, comprising:

an insulative housing comprising a pair of support portions at opposite ends thereof, each of the support portions defining a cavity and a through hole communicating with the cavity;

a plurality of contacts received in the insulative housing; and a pair of identical securing members mounted on the opposite ends of the insulative housing, each of the securing members comprising a first mounting boss received in a corresponding cavity of the insulative housing and defining a threaded hole aligned with the through hole of the insulative housing adapted for engaging with a bolt to mount the electrical connector on a printed circuit board.

2. The electrical connector as claimed in claim 1, wherein the contacts comprise surface mount solder portions located between the pair of support portions of the insulative housing for soldering to conductive pads of the printed circuit board.

3. The electrical connector as claimed in claim 1, wherein the insulative housing defines a pair of retention slots each communicating with the cavity and the through hole, and wherein each of the securing members comprises a body portion interferentially received in a corresponding retention slot.

4. The electrical connector as claimed in claim 3, wherein each of the securing members comprises a latch portion extending beyond a front face of the insulative housing through a corresponding retention slot and defining an opening adapted for engaging with a corresponding part of a complementary connector.

5. The electrical connector as claimed in claim 1, wherein the securing members are die-cast metallic parts.

6. The electrical connector as claimed in claim 5, wherein each of the securing members comprises a second mounting boss located behind a corresponding support portion and in alignment with the first mounting boss along a mating direction of the electrical connector, the second mounting boss defining a threaded hole adapted for engaging with a bolt.

7. The electrical connector as claimed in claim 6, wherein the insulative housing includes a base portion and a mating portion extending forwardly from the base portion, the pair of support portions extending rearwardly from opposite ends of the base portion.

8. The electrical connector as claimed in claim 7, further comprising a shield member enclosing the mating portion of the insulative housing, and a gasket attached on the shielding member and electrically connecting the shielding member with the securing members.

9. An electrical connector assembly comprising:

a printed circuit board;

at least a pair of through holes defined in the printed circuit board;

a connector mounted upon the printed circuit board and including an insulative housing defining a pair of support portions at two opposite lengthwise ends;

a plurality of contacts received in the housing; and a pair of securing members mounted to the support portions, each of said securing members including a retention body retained to the corresponding support portion, and an outer mounting boss exposed to an exterior behind the corresponding support portion along a front-to-back direction perpendicular to a lengthwise direction of the housing; wherein said mounting boss defines a threaded hole, and a screw vertically extends through the corresponding through hole and threaded hole so as to fastening the connector to the printed circuit board.

10. The assembly as claimed in claim 9, wherein said each of said securing members further includes a latching portion opposite to the corresponding mounting boss in said front-to-back direction.

11. The assembly as claimed in claim 10, wherein an inner mounting boss is located between the corresponding outer mounting boss and the corresponding latch portion in each of said securing members.

12. The assembly as claimed in claim 11, wherein said inner mounting boss is located in a cavity defined in each of said support portions.

13. An electrical connector assembly comprising:

a printed circuit board;

a pair of through holes defined in the printed circuit board;

a connector mounted to the printed circuit board and including an insulative housing with a pair of support portions at two opposite lengthwise ends;

a cavity defined in each of said support portions;

a through aperture defined in each of said support portions under the corresponding cavity; and a pair of securing members assembled to the housing along a rear-to-front direction, each of said securing members including a vertical body portion with a latch portion and a mounting boss located in the cavity and opposite to said latch portion; wherein a threaded hole is defined in the mounting boss, and a screw extends through the through hole, the through aperture and the threaded hole to securing the connector to the printed circuit board.

* * * * *